(12) United States Patent
Elisha

(10) Patent No.: US 9,413,778 B1
(45) Date of Patent: Aug. 9, 2016

(54) SECURITY POLICY CREATION IN A COMPUTING ENVIRONMENT

(71) Applicant: Amazon Technologies, Inc., Reno, NV (US)

(72) Inventor: Simon Jeremy Elisha, Melbourne (AU)

(73) Assignee: Amazon Technologies, Inc., Reno, NV (US)

( * ) Notice: Subject to any disclaimer, the term of this patent is extended or adjusted under 35 U.S.C. 154(b) by 64 days.

(21) Appl. No.: 14/133,416

(22) Filed: Dec. 18, 2013

(51) Int. Cl.
*H04L 29/00* (2006.01)
*H04L 29/06* (2006.01)
*G06F 21/62* (2013.01)

(52) U.S. Cl.
CPC ........ *H04L 63/1425* (2013.01); *G06F 21/6281* (2013.01)

(58) Field of Classification Search
CPC combination set(s) only.
See application file for complete search history.

(56) References Cited

U.S. PATENT DOCUMENTS

| 7,801,128 B2 * | 9/2010 | Hoole et al. | 370/389 |
| 2009/0288144 A1 * | 11/2009 | Huber et al. | 726/3 |
| 2010/0242082 A1 * | 9/2010 | Keene et al. | 726/1 |

OTHER PUBLICATIONS

U.S. Appl. No. 12/972,196, filed Dec. 17, 2010, Anders Samuelsson, "Creating Custom Policies in a Remote-Computing Environment".

* cited by examiner

*Primary Examiner* — Ghazal Shehni
(74) *Attorney, Agent, or Firm* — Lee & Hayes, PLLC

(57) ABSTRACT

This disclosure describes, in part, systems and techniques for creating policies to enable software to access resources protected by one or more rule sets after the software is implemented to run in a computing service that includes the one or more rule sets. To access different resources, network communication protocols and port addresses may be used, such as for inter-server communications. In some embodiments, an administrator of a particular computing service may initiate a learning mode that enables configuration of software to be run in the computing service and/or configuration of a computing service that runs the software. The learning mode may be implemented by a transmission manager using a manual learning mode and/or an automatic learning mode.

19 Claims, 10 Drawing Sheets

Group Membership Table

| Node | Group | ... |
|---|---|---|
| A | Group 1 | ... |
| B | Group 2 | |
| C | Group 2 | |
| D | Group 3 | |
| E | Group 4 | |
| ... | | |

FIG. 2A

Access Rights Table

| Group Name | Allowed Sender | HTTP | FTP | SMTP | ... |
|---|---|---|---|---|---|
| Group 1 | 0.0.0.0/0 | Yes | No | No | |
| Group 2 | Group 1 | Yes | No | No | |
| Group 2 | Group 3 | Yes | No | Yes | |
| Group 2 | 196.25.1.23 | Yes | Yes | Yes | |
| Group 3 | Group 2 | Yes | No | No | |
| Group 3 | 196.25.1.23 | Yes | Yes | Yes | |
| ... | | | | | |

FIG. 2B

Initial Condition (no information)

After B sends to D (HTTP) [allow] (example of allow)

After D send to A (SMTP) [deny] (example of denial)

After D sends to B (HTTP) [allow](e.g., allowance in other direction)

After A sends to B (FTP) [deny] (example of communication on same host)

After B sends to D (FTP) [deny] (e.g., different protocol to previously allowed test)

SECURITY POLICY CREATION IN A COMPUTING ENVIRONMENT

BACKGROUND

Software running on a computing service may access data and interact with other computing resources of the computing service to perform a variety of tasks. For instance, the software may initiate access to a storage resource of the computing service to store data or to obtain or alter previously-stored data. The software may also access other types of computing resources, which may host modules, components, or other functionality that may be used or accessed by the software.

Often, computing resources include one or more rule sets, which prevent unauthorized access to data or other resources. In a complex computing service, many different rule sets may exist to protect different resources, different types of information, and so forth. Rule sets may implement firewalls to restrict network access to the various resources.

In order to configure software to operate in a computing service that includes one or more rules sets, the software and/or permissions of the rule sets may require modification to allow access to information by the software, which would otherwise be restricted absent such allowances. This configuration process can be difficult and time consuming to implement.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2A-2B illustrate examples of using group membership information for managing communications between computing nodes.

DETAILED DESCRIPTION

Figure 1:
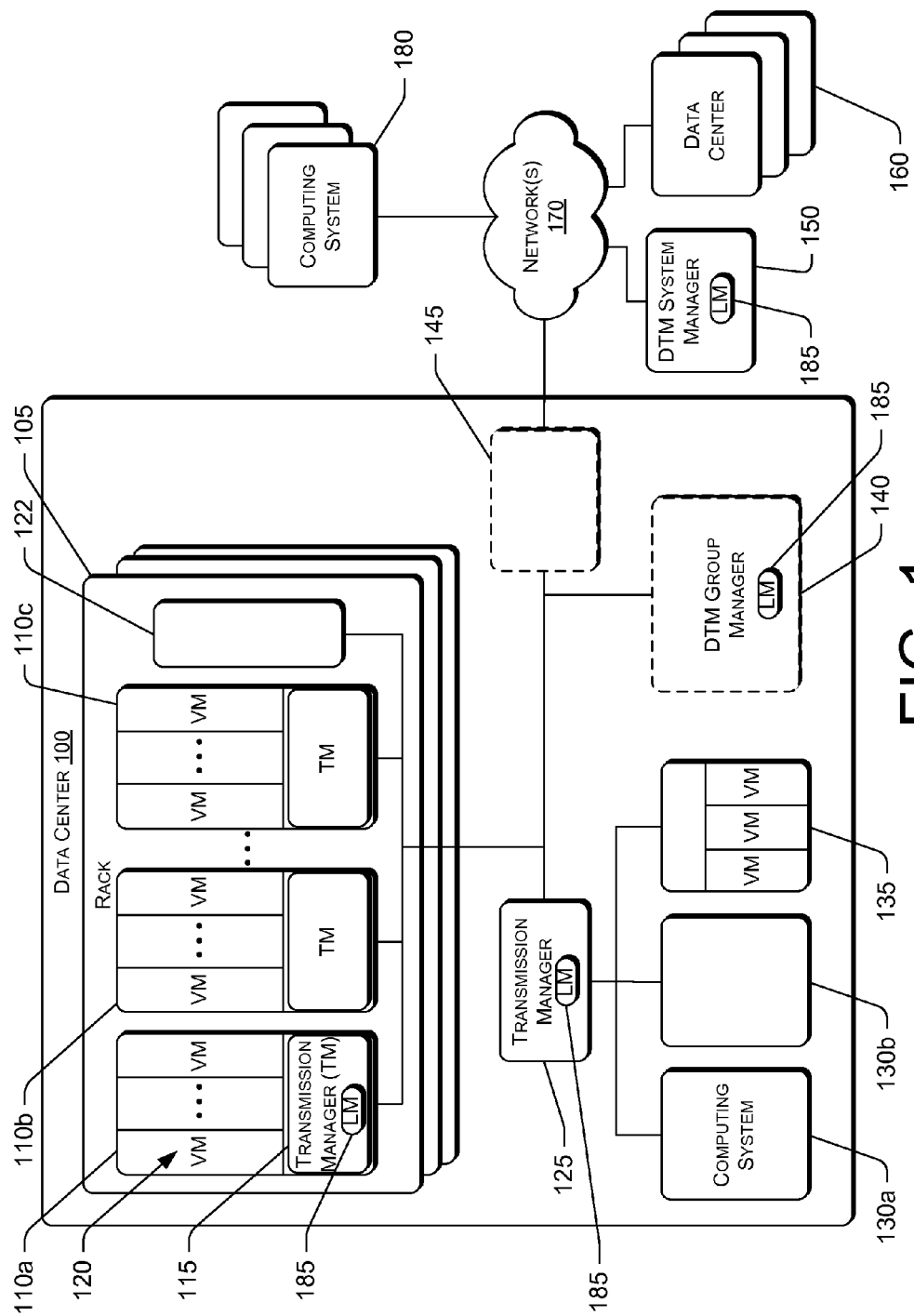
FIG. 1 is a network diagram illustrating an example embodiment in which multiple transmission manager components manage communications between computing nodes.

This disclosure describes, in part, systems and techniques for creating policies to enable software to access information and resources secured and protected by one or more rule sets after the software is migrated or otherwise installed or implemented to run in a computing service that includes the one or more rule sets. The rules sets may include firewalls or virtual firewalls which control network traffic by controlling network connections to one or more network ports. In one example, the systems and techniques are implemented in a network-based environment (e.g., a cloud-service, distributed computing environment, etc.). In this environment, a remote-computing service or other network-based service may include multiple different resources that provide different services for the software running in the computing service. For instance, the remote-computing service may provide a network-based service that accesses network-based resources. To access different resources, network communication protocols and port addresses may be used, such as for inter-server communications. In some embodiments, a server instance may be secured by a rule set, which may act as a firewall that controls the traffic allowed to reach one or more computing instances.

In some embodiments, an administrator of a particular computing service may initiate a learning mode that enables configuration of software to be run in the computing service and/or configuration of a computing service that runs the software. The learning mode may be implemented by a transmission manager using a manual learning mode and/or an automatic learning mode, each discussed in turn.

The manual learning mode, when implemented by the transmission manager, may monitor traffic associated to or from an instance's software. When the software causes an operation that requires network access to a resource protected by a rule set (e.g., rules related to a range of ports to allow, a particular protocol to allow, inbound or outbound rules to apply to IP addresses, etc.), the transmission manager may block the operation and may log an event and/or notify a user to address the event. In some embodiments, the transmission manager, while operating in the manual learning mode, may allow a user to create a rule and/or update a policy to allow the operation (e.g., initiate a network connection on a particular port, use a particular protocol to access another instance in the same or another rule set, etc.). The software may then continue to run in the instance until a next operation is blocked, and so forth. Thus, the transmission manager may use the manual learning mode to allow a user to step through operation of the software, and create rule/policy updates in response to blocked events. The manual learning mode may be terminated after a certain period of time, such as when the user is satisfied that the policies have been adequately updated to allow the software to run in the computing service without inbound traffic blocked or it being blocked from accessing resources protected by rule sets.

The automatic learning mode, when implemented by the transmission manager, may cause the transmission manager to allow the software to run without regard to a particular access policy. For example, the transmission manager may enable the software to initiate a network connection on a particular port and/or access resources protected by rule sets, therefore, effectively disabling to some extent, at least temporarily, security in the computing service. The transmission manager may track the software's interactions with various rule sets, such as by logging various events. The resulting log may be reviewed and may possibly be modified to add, remove, or update some operations (e.g., privileges, etc) represented in the log. The automatic learning mode may be terminated after a certain period of time, such as when the user is satisfied that the policies have been adequately updated. The automatic learning module may be terminated by the transmission manager, such as based on an amount of time since a last logged event that is a unique (new) event. The transmission manager, a manager component, or a service may create rules and/or policy updates based in part on the log and/or modifications to the log, to enable the software to run in the computing service without being blocked from accessing resources protected by rule sets used by the software. In some embodiments, the automatic learning mode may be run or implemented in a shadow service rather than a live version of the computing service.

In some embodiments, the transmission manager may create and enforce rule sets that manage traffic associated with one or more virtual machines that a virtualization system (e.g., including the transmission manager) hosts or manages. During typical or normal operation (e.g., at times other than operation in the learning mode), the transmission manager may enforce rules to block network traffic to or from a virtual machine, thus causing a blocking of packets to prevent the packets from flowing into or out of the virtual machine. However, when the learning mode is activated, the transmission module may log data related to network access operations directed to/from the virtual machines.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

FIG. 1 is a network diagram illustrating an example embodiment in which multiple Transmission Manager ("TM") components manage communications between computing nodes, with the multiple TM components being part of a Data Transmission Management ("DTM") system managing the data transmissions of various computing nodes located within a data center 100. Further, the TM or the DTM system manager may implement learning modes that allow software to obtain access to various computing nodes. In this example, data center 100 comprises a number of racks 105, which each include a number of physical computing systems 110a-c and a rack support computing system 122. The computing systems 110a-c each provide one or more virtual machine nodes 120, which each may be employed to provide an independent computing environment to host applications within the data center 100. In addition, the computing systems 110a-c each host a TM component node 115 that manages outgoing data transmissions from other virtual machine nodes 120 hosted on the computing system, as well as incoming data transmissions from other nodes (whether local or remote to the data center 100) to those hosted virtual machine nodes on the computing system. In this example embodiment, the rack support computing system 122 provides utility services for computing systems local to the rack (e.g., data storage services, network proxies, application monitoring and administration, etc.), as well as possibly other computing systems located in the data center, although in other embodiments such rack support computing systems may not be used. The computing systems 110a-c and the rack support computing system 122 of a rack in this example all share a common, high-speed, rack-level network interconnect (e.g., via a shared backplane, one or more hubs and/or switches that are physically local or remote to the particular rack, etc.), not shown.

In addition, the example data center 100 further comprises additional computing systems 130a-b and 135 that are not located on a rack, but share a common network interconnect to a TM component 125 associated with those additional computing systems, although in other embodiments such additional non-rack computing systems may not be present. In this example, computing system 135 also hosts a number of virtual machine nodes, while computing systems 130a-b instead act as a single physical machine node. The TM component 125 similarly manages incoming and outgoing data transmissions for the associated virtual machine nodes hosted on computing system 135 and for computing system nodes 130a-b. An optional computing system 145 is also illustrated at the interconnect between the data center 100 local network and the external network 170, such as may be employed to provide a number of services (e.g., network proxies, the filtering or other management of incoming and/or outgoing data transmissions, etc.), including to manage outgoing data transmissions from some or all nodes internal to the data center 100 to nodes located in additional data centers 160 or other systems 180 external to the data center 100 and/or to manage incoming data transmissions to some or all internal nodes from external nodes. An optional DTM Group Manager component 140 is also illustrated and may provide a number of services to TM components local to the data center 100, such as to maintain global state information for the TM components (e.g., group membership information, access policies, etc.).

The example data center 100 is connected to a number of other computing systems via a network 170 (e.g., the Internet), including additional computing systems 180 that may be operated by the operator of the data center 100 or third parties, additional data centers 160 that also may be operated by the operator of the data center 100 or third parties, and an optional DTM System Manager system 150. In this example, the DTM System Manager 150 may maintain global state information for TM components in a number of data centers, such as the illustrated data center 100 and additional data centers 160. The information maintained and provided by the DTM System Manager may, for example, include group membership information, access policies, etc. Although the example DTM System Manager 150 is depicted as being external to data center 100 in this example embodiment, in other embodiments it may instead be located within data center 100.

The TM 115, the TM 125, the DTM group manager 140, and/or the DTM system manager 150 may include a learning module 185 that is configured to selectively initiate and terminate a learning mode. One or more types of learning modes may be used to enable software communications between various computing nodes by way of creation of new rules to allow such communications. The software may be newly installed software, upgraded software, or other types of software that may not presently have access to at least some of the communication nodes. Absent rules allowing such traffic, the TM would block communications between the computing nodes and thus prevent at least some operations caused by the software. The example data center 100 may provide an environment for use of the learning mode.

Example Rule Sets

FIGS. 2A-2B illustrate examples of using group membership information for managing communications between computing nodes. The data illustrated in FIGS. 2A and 2B may be maintained and provided in various manners, such as by the DTM System Manager system 150 shown in FIG. 1 and/or by one or more of various TM components (e.g., in a distributed manner without use of a central system). As discussed below, the TM (and/or the DTM managers) may implement learning modes via the learning module 185 that may, in some instance, update information and/or create new information in the group membership table or the access rights table. Thus, the learning modes may enable the TM to create new rules, which are explained with reference to FIG. 3A-3F, using the group membership table, the access rights table and/or new information obtained through use of the learning modes.

FIG. 2A depicts a table 200 that contains membership information for multiple node groups. In particular, each data row 204b-204f describes a membership association between a node denoted in column 202a and a group denoted in column 202b. Thus, for example, rows 204c and 204d indicate that node group Group2 includes at least nodes A and B, and rows 204e and 204f indicate that node D is a member of at least two groups. For illustrative purposes, the nodes in the present example are all indicated by single letters, such as 'A', 'B', 'C', etc., although they could instead be indicated in other ways in other embodiments, such as Internet Protocol ("IP") addresses, DNS domain names, etc. Similarly, groups are indicated in the present example by strings such as "Group1", but various other types of names may be used, and in at least some embodiments users may be able to specify descriptive group names for groups that they use. Column 202c indicates that various types of additional information may be specified and used for groups, such as expiration dates, contact information for the user that created or otherwise manages the group, etc. As discussed below, this table may be updated at least in part by use of the learning module 185 in response to operation of software in the learning mode.

FIG. 2B depicts a table 210 that specifies access rights associated with some of the groups indicated in FIG. 2A. In particular, each data row 214b-214g indicates a named sender in column 212b that is authorized to act as a source node to transmit data to any node that is a member of the group named in column 212a. In the present example, such access rights may be specified specific to a particular transmission protocol, with three example protocols shown, those being HTTP 212c, FTP 212d, and Simple Mail Transport Protocol ("SMTP") 212e. In addition, senders may be identified in three different manners in the present example, including by IP address, by IP address range, or by group name, although other naming conventions may be employed in other embodiments (e.g., DNS domain names). For example, row 214b indicates that sending nodes that have IP addresses in the range 0.0.0.0/0 (used here to represent all hosts) may initiate communications using the HTTP protocol to nodes that are members of Group1, but that such sending nodes may not initiate communication to nodes that are members of Group1 using either the FTP or SMTP protocol. Row 214c shows that source nodes that are members of Group1 may initiate communications to nodes that are members of Group2 using the HTTP protocol, but not the FTP or SMTP protocol. Row 214d shows that source nodes that are members of Group3 may initiate communication to nodes that are members of Group2 using the HTTP or SMTP protocols, but not the FTP protocol. Row 214e shows that the single source node with the IP address 196.25.1.23 may initiate communication with member nodes of Group2 using any of the three listed protocols. Subsequent rows 214f-214h contain descriptions of additional access policies. Column 212f indicates that additional information may be specified with respect to access policies (e.g., additional protocols, types of operations, types of data formats, policy expiration criteria such as timeouts, contact information for the user that created or otherwise manages the policy, etc.).

In the example shown in FIG. 2B, access policies may be specified on a per-transmission protocol basis. In the present example, when a source is granted access via a particular protocol, such as HTTP, this may be taken to mean that the sender may send Transmission Control Protocol ("TCP") packets to nodes in the specified group at the default port for HTTP, port 80. Other embodiments may allow access rights to be specified at other levels of details, such as to not indicate particular protocols, or to further specify particular ports for use with particular protocols. For example, some embodiments may allow access rights to more generally be specified with respect to any transmission properties of particular network transmissions, such as types of packets within particular protocols (e.g., TCP SYN packets, broadcast packets, multicast packets, TCP flags generally, etc.), connection limits (e.g., maximum number of concurrent connections permitted), packet size, packet arrival or departure time, packet time-to-live, packet payload contents (e.g., packets containing particular strings), etc. In addition, other embodiments may specify access policies in various manners. For example, some embodiments may provide for the specification of negative access policies, such as ones that specify that all nodes except for the specified senders have certain access rights. Also, different embodiments may provide varying semantics for default (unlisted) access policies. For example, some embodiments may provide a default policy that no sender may communicate with nodes of a given group unless authorized by a particular other policy, with other embodiments may provide a default policy that senders operated by a given user may by default communicate with any other nodes operated by the same user, or that nodes in a given group may by default communicate with other nodes in the same group. Finally, various embodiments may specify groups and group membership in various ways, such as by providing for hierarchies of groups or to allow for groups to be members of other groups, such that a policy would apply to any node below an indicated point in the hierarchy or to any node that is a member of a indicated group or of any sub-groups of the indicated group.

The access rights table may be updated at least in part by the TM (and/or the DTM manager) in response to operation of software in the learning mode. In some embodiments, access rights created based on use of the learning mode by the TM may provide narrow or restrictive access rights to allow a particular operation requested by the software, and possibly without allowing access by other similar operations performed by other software.

FIGS. 3A-3F illustrate examples of dynamically modified transmission management rules used for managing communications between computing nodes. In the example embodiment, the transmission management rules are used by a given TM component to make decisions about whether to authorize or not authorize data transmissions by one or more associated nodes that are managed by the TM component, with each TM component maintaining its own set of rules. In other embodiments, the rules shown in FIGS. 3A-3F could alternatively be maintained by the DTM Group Manager component 140 of FIG. 1, the DTM System Manager system 150 of FIG. 1, or one or more other components that provide shared access to one or more TM components.

In the example illustrated in FIGS. 3A-3F, two example TM components DTM1 and DTM2 dynamically generate and modify transmission management rules over time based on initiated data transmissions, with DTM1 managing two associated nodes A and B and with DTM2 managing associated node D. Both example DTMs also maintain information related to the group memberships of nodes being managed, as well as to associated access policies for the groups. In the present example, node A belongs to Group1, node B belongs to Group2, and node D belongs to Group3 and Group4, as shown in rows 204b-e in FIG. 2A. The DTMs may obtain information about group membership and access policies in various ways. For example, when a new node to be managed by a particular DTM comes online, the DTM may be notified of this new node and its network address (e.g. IP address), and the DTM may be able to access the group membership and access policy information for the new node (e.g., by querying and/or being notified by the DTM Group Manager component 140 or the DTM System Manager system 150, by retrieving the information from a network-accessible data store, etc.). In addition, changes related to group membership (e.g., a particular existing node is added to or removed from a group) and access policies (e.g., the access policies related to a particular group are modified, such as to now allow data transmissions from another group that previously did not have such authorization) may be communicated to DTMs in a variety of ways. In some embodiments, only the DTMs that are managing nodes affected by a particular change will be notified, such as via information sent from, for example, a DTM Group Manager component and/or a DTM System Manager system. In other embodiments, such changes may be broadcast to all DTMs, or instead all DTMs may be configured to periodically poll an appropriate component in order to obtain updates related to such state changes.

Although the updating of the rules sets in this discussion that references FIGS. 3A-3F illustrates using information in the group membership table and the access table, the updating the rules sets may be performed by creating rules in response to software operations that occur in a learning mode controlled by the TM. Thus, the discussion below with reference to FIGS. 3A-3F describes one way to create rules, while additional ways of updating or creating rules is discussed below with reference to FIG. 5-9, which relies on use of the learning mode. Thus, the discussion with reference to FIGS. 3A-3F describes possible table and rule structures.

Figure 3A:
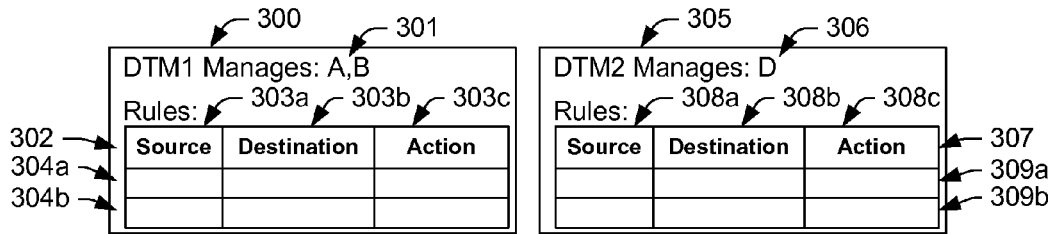
FIGS. 3A-3F illustrate examples of dynamically modified transmission management rules used for managing communications between computing nodes.

FIG. 3A illustrates initial conditions for DTM1 and DTM2 before any of the three nodes have initiated any communications with other nodes. Table 300 represents the transmission management rule set and other information maintained by DTM1. Row 301 lists the nodes that are currently managed by DTM1, in this case nodes A and B. Table 300 further includes a sub-table 302 that shows the transmission management rules maintained by DTM1. Each row 304a-304b can hold a transmission management rule that describes a transmission policy with respect to a node, with each rule specifying a source 303a, a destination 303b, and an action 303c. Because no nodes have initiated communication at this point, the rule set shown is empty, although in some embodiments a low priority default rule may be included (e.g., if no other rules apply, deny an initiated data transmission). Similarly, Table 305 shows the transmission management rules maintained by DTM2. Row 306 shows that DTM2 manages a single node, D. In addition, sub-table 307 shows an empty transmission management rule set, because node D has yet to initiate any communication.

Figure 3B:
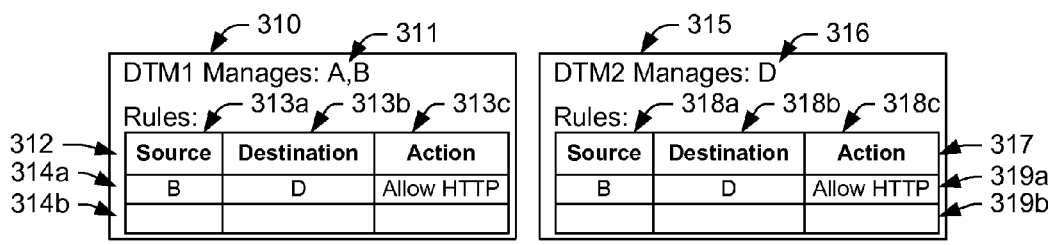

FIG. 3B shows the state of the rule sets after node B has initiated communication with node D via the HTTP protocol. When node B attempts to begin to transmit data to node D, DTM1 first inspects its rule set to determine whether there are any existing rules that govern data transmissions from node B to node D. Finding none, DTM1 negotiates with DTM2 to determine whether node B is authorized to transmit data to node D, and as part of the negotiation DTM1 informs DTM2 that node B has attempted to transmit data to node D via HTTP and that node B is a member of Group2. In some embodiments, such a negotiation involves DTM1 generating and transmitting a negotiation message to destination node D, with the expectation that node D's DTM (whose identity and network address may be unknown to DTM1) will intercept and respond to the negotiation message in an appropriate manner. As described above, DTM2 knows that node D is a member of groups Group3 and Group4, as shown in rows 204e and 204f of FIG. 2A, and that Group3 has allowed members of Group2 to initiate communications via the HTTP protocol, as shown in row 214f of FIG. 2B. Because the desired communication is allowed by the stated access policies, DTM2 responds to the negotiation request by sending a response that indicates authorization for node B to communicate with node D to DTM1. DTM2 further stores a transmission management rule in row 319a that allows HTTP communication from source node B to destination node D. After DTM1 receives the response indicating authorization from DTM2, it also stores a transmission management rule in row 314a that allows HTTP communication from source node B to destination node D. In the present example, because the two DTMs have negotiated and stored rules granting authorization for node B to transmit data to node D via HTTP, future data transmissions from node B to node D using the same protocol will not necessitate the re-negotiation of authorization. In addition, while not illustrated here, in some embodiments the DTM components will also automatically authorize at least some data transmissions from node D to node B (e.g., to authorize replies from node D to data transmissions to node D from node B), whether by adding corresponding transmission management rules or by otherwise authorizing such data transmissions.

In some embodiments, any data destined for node D that was received from node B by DTM1 before the negotiation completed would have been queued by DTM1 until it was determined whether or not node B was authorized to transmit data to node D. In such embodiments, after having received an indication of authorization to communicate with node B, DTM1 would then transmit any queued data to node D, as well as any data that arrived subsequent to the negotiation. In other embodiments, any data destined for node D that was received from node B by DTM1 prior to the completion of the negotiation would instead be discarded by DTM1. Such techniques may be appropriate in situations in which some data transmission loss is acceptable or in which a sending node will resend any data transmissions that are not received and acknowledged by the intended recipient. For example, many transmission protocols will retransmit any lost packets (e.g., based on the timeout and retransmission mechanisms of TCP), and while such a discard-based approach may result in the initial loss of some packets that should ultimately have been delivered (e.g., in the case of a successful negotiation) in this situation, the retransmission will ensure that those initial packets will be resent. Alternatively, in some embodiments before a negotiation is completed or authorization is otherwise obtained for node B to transmit data to node D, the data transmissions could be sent toward node D and be queued at DTM2 (e.g., after being intercepted by DTM2) until authorization is obtained or DTM2 otherwise determines to forward the queued data transmissions to node D (or to discard the data transmission if authorization is ultimately not obtained).

Figure 3C:
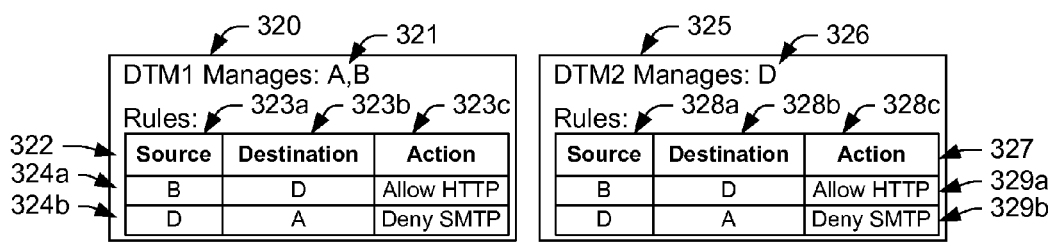

FIG. 3C shows the state of the rule sets after node D has initiated communication with node A via the SMTP protocol. When node D attempts to begin to transmit data to node A, DTM2 first inspects its rule set to determine whether there are any existing rules that govern data transmissions from node D to node A. Finding none, DTM2 negotiates with DTM1 to determine whether node D is authorized to transmit data to node A using the given protocol. DTM2 informs DTM1 that node D is a member of Group3 and Group4 as shown in 204*e* and 204*f* in FIG. 2A, and that node D has attempted to communicate with node A via SMTP. DTM1 knows that node A is a member of Group1 as shown in row 204*b* in FIG. 2A and that Group1 has granted access to all hosts to communicate with it via HTTP, but not SMTP, as shown in row 214*b* of FIG. 2B. Because no host is allowed to transmit data to node A using the SMTP protocol, DTM1 responds to the negotiation request by sending a response to DTM2 that indicates a denial of authorization for node D to communicate with node A via the SMTP protocol. DTM1 further stores a transmission management rule in row 324*b* that denies SMTP communication from source node D to destination node A. After DTM2 receives the response indicating a denial of authorization from DTM1, it also stores a transmission management rule in row 329*b* that denies authorization for future SMTP communications from source node D to destination node A. Again, any data that node D attempted to transmit to node A prior to the completion of the negotiation would have been queued by DTM2 in at least some embodiments. Upon completion of the negotiation process, DTM2 would then drop any queued and all future data sent by node D to node A via the SMTP protocol.

Figure 3D:
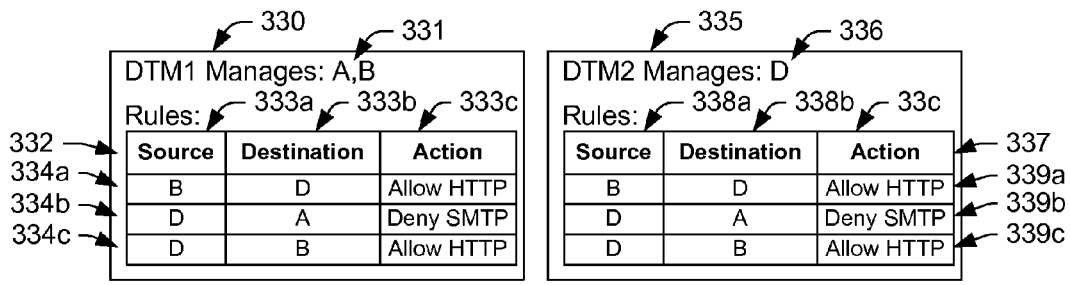

FIG. 3D shows the state of the rule sets after node D has attempted to initiate communication with node B via the HTTP protocol. In effect, the situation described with reference to this figure is the reverse case of the situation described with reference to FIG. 3B, above. An inspection of the tables shown in FIGS. 2A and 2B shows that this communication is authorized, because node B belongs to Group2 (FIG. 2A, row 204*c*), Group2 has granted authorization to members of Group3 to transmit data via the HTTP protocol (FIG. 2B, row 214*d*), and node D is a member of Group3 (FIG. 2A, row 204*e*). Therefore, DTM2 will successfully negotiate authorization for node D to transmit data to node B via HTTP, the applicable rule will be added by DTM2 in row 339*c* and by DTM1 in row 334*c*, and data sent from node D via the HTTP protocol to node B will be forwarded by DTM2. Note also that in this example that node D is permitted to transmit data to node B via multiple protocols (e.g., both HTTP and SMTP). Some embodiments may perform an optimization in such cases by responding to a negotiation request regarding a particular transmission protocol with a response that indicates all of the transmission protocols that the sending node is authorized to use to communicate with the destination node (as opposed to only the requested protocol), such as to in this example cause additional rules to be added for DTM1 and DTM2 to indicate that node D is authorized to send SMTP communications to node B. Such an optimization eliminates the need to perform additional later negotiations with respect to the other authorized protocols.

Figure 3E:
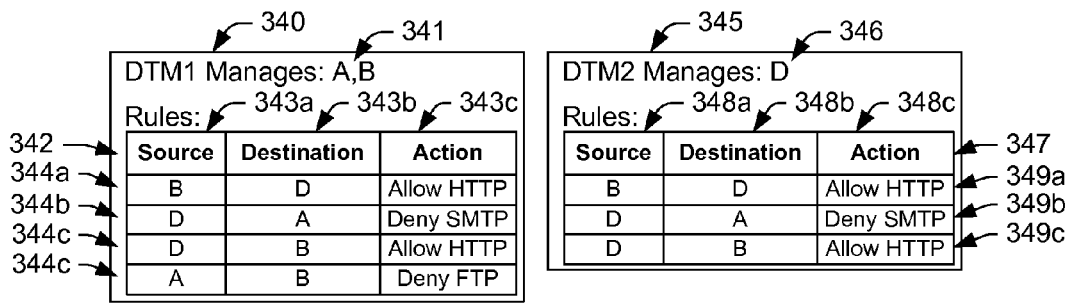

FIG. 3E shows the state of the rule sets after node A has attempted to initiate communication with node B via the FTP protocol. In this case, the source and destination nodes are both managed by the same DTM, and in some embodiments DTM1 may not manage such data transmissions, although in the illustrated embodiment such data transmissions are managed (although DTM1 does not have to negotiate with a remote DTM in this case). An inspection of the tables shown in FIGS. 2A and 2B shows that this communication is not authorized, because node B belongs to Group2 (FIG. 2A, row 204*c*), node A belongs to Group1 (FIG. 2A, row 204*b*), but Group2 has not granted authorization for members of Group1 to transmit data via the FTP protocol (FIG. 2B, row 214*c*). DTM1 therefore adds the applicable rule to row 344*d* and drops any data transmitted from node A to node B using the FTP protocol.

Figure 3F:
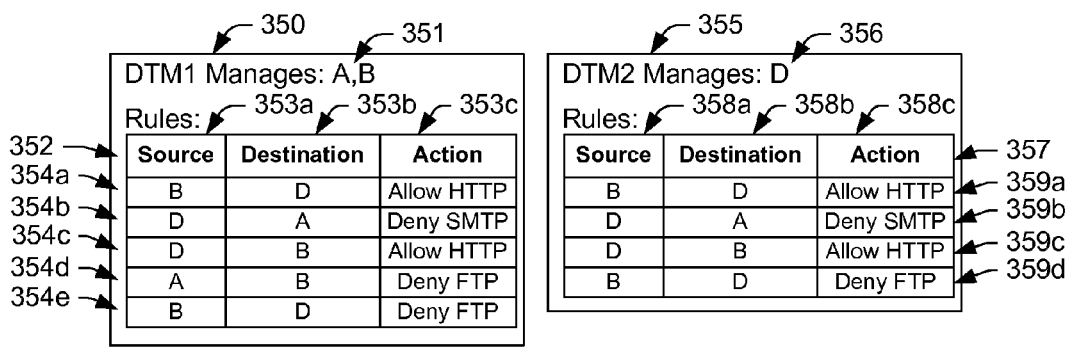

FIG. 3F shows the state of the rule sets after node B has attempted to initiate communication with node D via the FTP protocol. This figure shows an example of an attempt by a source node to transmit data to a previously allowed destination node, but using a different protocol. An inspection of the tables shown in FIGS. 2A and 2B shows that this communication is not authorized, because node B belongs to Group2 (FIG. 2A, row 204*c*), node D belongs to Group3 (FIG. 2A, row 204*e*) but Group3 has not granted authorization to members of Group2 to transmit data via the FTP protocol (FIG. 2B, row 214*f*). Therefore, DTM1 will not be successful in negotiating authorization for node B to transmit data to node D via FTP and the applicable rule will be added by DTM1 in row 354*e* and by DTM2 in row 359*d*. In addition, DTM1 will drop any data transmitted from node B to node D using the FTP protocol.

Thus, in the manner indicated, the transmission manager components may dynamically create transmission management rules based on managing initiated data transmissions. While not illustrated here, in other embodiments the rule sets for a transmission manager component and/or for a particular node may be modified in other manners, such as to remove all rules corresponding to a node after its associated group membership or other relevant information changes (e.g., after a program being executed on behalf of a first customer on a virtual machine node is terminated) so that the node (or another node that is later allocated the same relevant information, such as the same network address as was previously used by the node) will need to re-negotiate to determine appropriate authorizations, or instead to remove only rules that are affected by a particular change. For example, if the access policies for group3 are dynamically changed at the current time so that group2 no longer is authorized to sent HTTP communications to group3, node B (of group2) will no longer be authorized to send HTTP transmissions to node D (of group3). Accordingly, rule 354*a* for DTM1 and rule 359*a* for DTM2 are no longer valid, and the change to the access policy will prompt those two rules to be removed, but other rules involving nodes B and D (e.g., rules 354*e* and 359*d* for DTM1 and DTM2, respectively) may be maintained in at least some embodiments.

Figure 4:
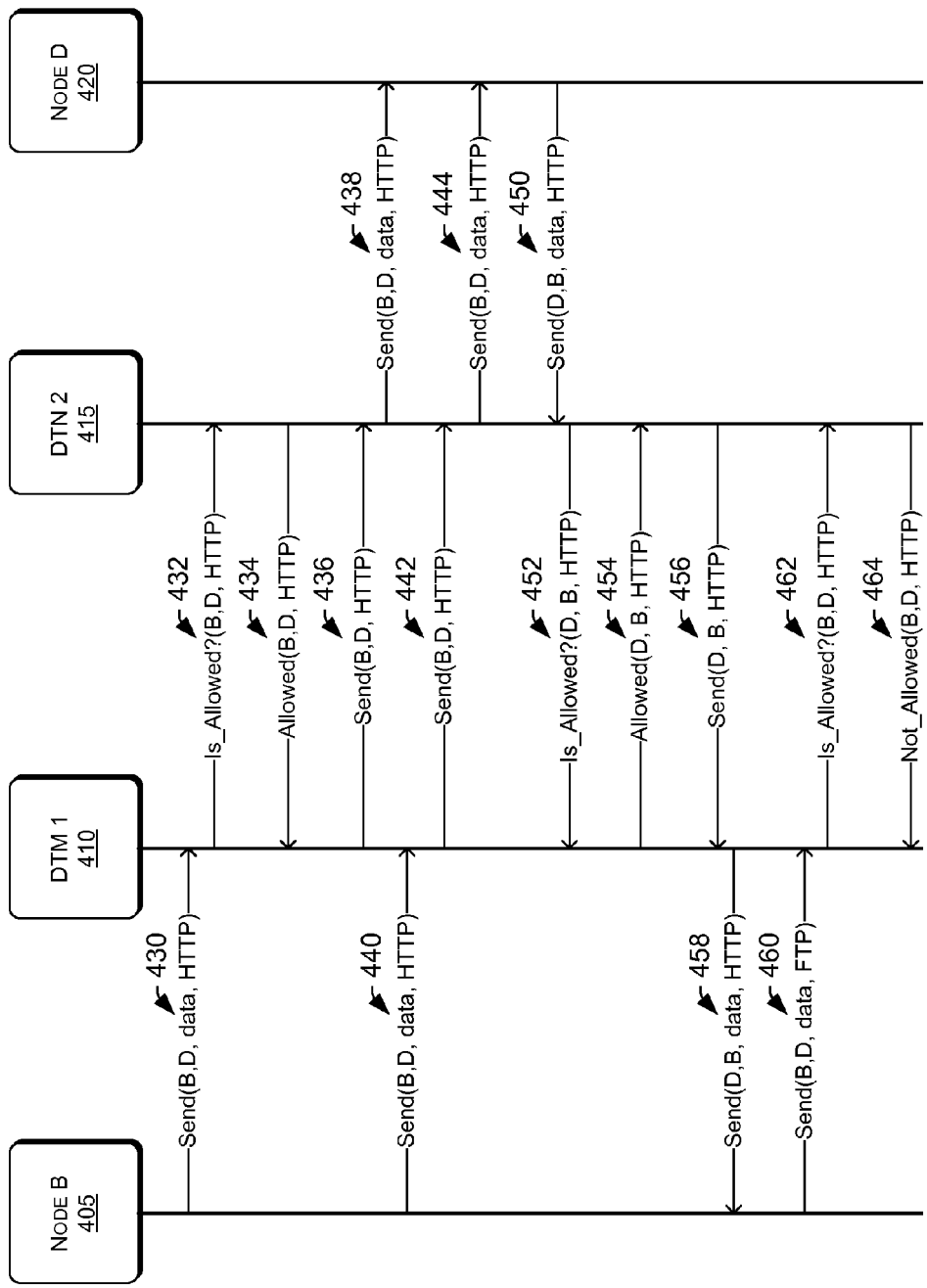
FIG. 4 illustrates examples of data transmissions between two intercommunicating computing nodes and associated transmission manager components that manage the communications.

FIG. 4 illustrates examples of data transmissions between two intercommunicating computing nodes and associated transmission manager components that manage the communications, with the data transmissions shown in a time-based order (with time proceeding downwards). The message names and message contents in this example are illustrative of messages that may be passed between DTM 1 and DTM 2 while managing nodes B and D, although other message passing or other interaction schemes are possible in other embodiments. In addition, in some embodiments the initiation of a data transmission and the corresponding protocol being used may be determined by inspecting underlying data and/or control packets that are detected (e.g., TCP packets, User Datagram Protocol ("UDP") packets, etc.). In particular, FIG. 4 shows an example of messages passed between nodes and DTMs during a successful negotiation as described with reference to FIG. 4B. Initially, node B 405 attempts to send data via the HTTP protocol to node D 420 by transmitting a Send message 430. DTM1 410 receives this message and takes it as an indication that node B is attempting to transmit data to node D. At this point, DTM1 has no rules governing such transmissions, so it attempts to negotiate permission with DTM2 415. In this example it does so by sending an Is_Allowed? message 432 that is received by DTM2, although in at least some embodiments the message 432 is addressed to remote destination node D but intercepted by the DTM that manages the data transmissions for that remote node, as discussed in greater detail elsewhere (in this way, a sending DTM may operate without knowledge of the network location of the remote DTM). DTM2 determines by inspection of the appropriate data that node D has authorized such transmissions, and therefore sends an Allowed message 434 that is received by DTM1. Having received authorization to transmit, in the illustrated embodiment DTM1 transmits the data queued from the Send message 430 in a second Send message 436 to node D that is again received by DTM2, who forwards this data via Send message 438 to its final destination of node D 420. As previously noted, in other embodiments DTM1 may not queue the Send message 430 while performing the negotiation, and thus would not transmit the Send message 436 in this example. Subsequent to the negotiation, node B attempts to transmit more data to node D by sending a Send message 440. Since DTM1 has previously negotiated authorization for this type of data transmission, it forwards the data via Send message 442 without additional negotiation. DTM2 receives Send message 442 and similarly forwards the data to node D via Send message 444.

Next, FIG. 4 shows an example of messages passed between nodes and DTMs during a successful negotiation as described with reference to FIG. 4D. Initially, node D attempts to transmit data to node B via HTTP by way of the Send message 450. If the data transmission is related to the prior authorized data transmissions from node B to node D using HTTP (e.g., is a reply to received Send message 444 or otherwise is part of the same session), DTM1 and DTM2 will in some embodiments automatically have authorized such reply data transmissions as part of the prior negotiation process, as discussed in greater detail elsewhere—this ability to automatic authorize such replies may provide various benefits, such as to enable some types of transmission protocols (e.g., TCP) to function effectively. In this example, however, DTM2 instead initiates a separate authorization negotiation for the data transmission with the Is_Allowed? message 452. DTM1 determines by inspection of the appropriate data that node B has authorized such transmissions, and therefore responds with an Allowed message 454. Finally, DTM2 forwards the queued data from Send message 450 by way of a new Send message 456, which DTM1 forwards to its ultimate destination by way of Send message 458. Finally, FIG. 4 shows an example of messages passed between nodes and DTMs during a negotiation that results in a denial of authorization as described with reference to FIG. 4F. Initially, node B attempts to transmit data to node D via FTP by way of the Send message 460. DTM1 initiates negotiation with DTM2 via the Is_Allowed? message 462. DTM2 determines by inspection of the appropriate data that node D has not authorized such transmissions, and therefore responds with a Not_Allowed message 464. In response, DTM1 drops the data received by way of the Send message 460.

As discussed below in more detail, the TM may operation in a learning mode, which may allow operations by software to receive automatic or manual permission (while operating in the learning mode) and thus facilitate allowance of operations between DTM1 410 and DTM2 415. Once allowed, and possibly after approval, rules may be created to allow the operation(s) after the learning mode is terminated. Thus, the data flow structure shown in FIG. 4 can be configured for implementation of the learning mode as discussed below.

Illustrative Computing Environment

Figure 5:
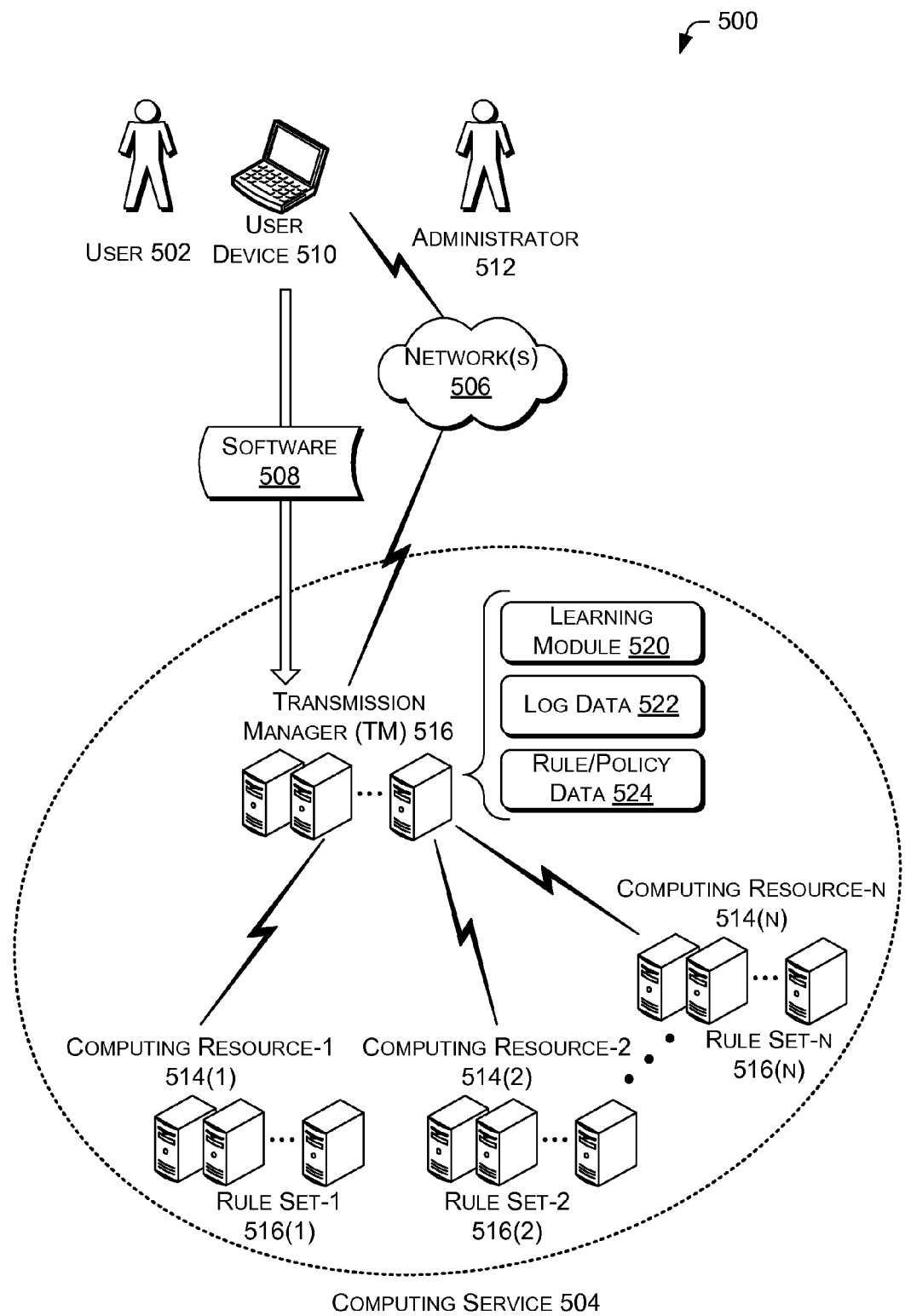
FIG. 5 is a schematic diagram of an illustrative computing environment that includes software being migrated, loaded, or otherwise caused to be run by a computing service.

FIG. 5 illustrates an example environment 500 that may implement the described techniques. The environment 500 includes a user 502 that interacts with a computing service 504, possibly over a network 506. The user 502 may be a developer, an information technology specialist, or another person or entity that desires to migrate, install, or otherwise cause the computing service 504 to run software 508. The user 502 may use a user device 510 to create, modify, test, or otherwise interact with the software 508 prior to migrating, installing, or otherwise causing the computing service 504 to run the software 508. The software 508 may be developed by the user 502 or may be off the shelf software that is possibly configured by the user 502. The software may include modules, plug-ins, and/or add-ons that operate with other software and/or may include a standalone software application. In some instances, an administrator 512 may assist the user 502 in accessing the computing service 504. However, the administrator 512 and the user 502 may be a same person.

The network 506, meanwhile, is representative of any one or combination of multiple different types of networks, such as the Internet, cable networks, cellular networks, wireless networks, and wired networks. The network 508 may be a public or a private network.

As illustrated, the computing service 504 may include any number of computing resources 514 (also called "resources"), such as a first computing resource 514(1), a second computing resource 514(2), . . . , and a last computing resource 514(N). The computing resources 514 may include a virtualization system as described above with respect to FIG. 1. The user's software may be an application the use developed and deploys on an operating system that runs within a virtual machine. The virtual machine in turn runs in the virtualization system. The virtualization system, which in an example embodiment includes a transmission manager, enforces the rule sets, as discussed above with respect to FIGS. 2A-2B and FIGS. 3A-3F. The transmission manager reports the operations to the DTM system manager. The computing resources 514(1)-(N) are protected by corresponding rule sets 516(1)-(N), which control network connections for one or more ports used to access one or more of the computing resources. While FIG. 5 illustrates a few example computing resources, the computing service 504 may include more, fewer, and/or different ones of the computing resources 514 in other embodiments, such as the computing resources shown in FIG. 1. Furthermore, the computing resources 514 may reside geographically remote from one another (e.g., in different data centers), at a common geographical location (e.g., in a common data center), or even in a common housing of a computing device. That is, the computing service 504 may comprise multiple large-scale data centers having resources situated across the globe, a single computer that stores multiple different resources, or any other environment there between.

In some instances and as illustrated, the computing resources 514 of the computing service 504 may be embodied as one or more servers that collectively have processing and storage capabilities. These servers may be embodied in any number of ways, including as a single server, a cluster of servers, a server farm or data center, and so forth, although other server architectures (e.g., mainframe) may also be used. Each server may include one or more processors and memory, which may include, but is not limited to, RAM, ROM, EEPROM, flash memory, or other memory technology.

The computing resources 514 may provide or host different types of data, run different services or application, and/or provide other types of functionality. In some embodiments, the computing resources 514 may launch virtual machines for customers, such as the user 102. The rule sets 516 may be used to protect the computing resources from unauthorized network access.

FIG. 5 further illustrates a TM 518 that facilitates configuration of the software 508 and/or the computing service via creation and/or update of rules/polices. The TM 518 may allow the software 508 to perform an initial run in the computing service prior to the configuration, and thereby allow the configuration based on monitoring of the software. The TM 518 may initially run the software in a learning mode to enable the configuration. Although the following discussion describes the learning mode as being implemented by the TM 518, the learning mode may be implemented by a DTM manager as discussed above. Thus, the learning mode may be implemented by one or more TM, by one or more TM manager, or any combination thereof.

The TM 518 may store or otherwise have access to a learning module 520 (e.g., an instance of the leaning module 185 shown in FIG. 1), log data 522, and rules/policy data 524. In some instances, the software 508, after installation, may run on the computing resources 514 after the TM 518 implements the learning mode using the learning module 520. In these instances, the learning module 520 may track interactions, events, network access requests, and/or any other operation caused by the software 508 in association with the rules sets 516 that protect the computing resources 514. In response to the tracking, the learning module 520 may populate the log data 522 with some or all of the interactions, events, operations, etc., and create, update, modify, or otherwise change network access rules/policies in the rules/policy data 524 based in part on the log data 522.

Figure 6:
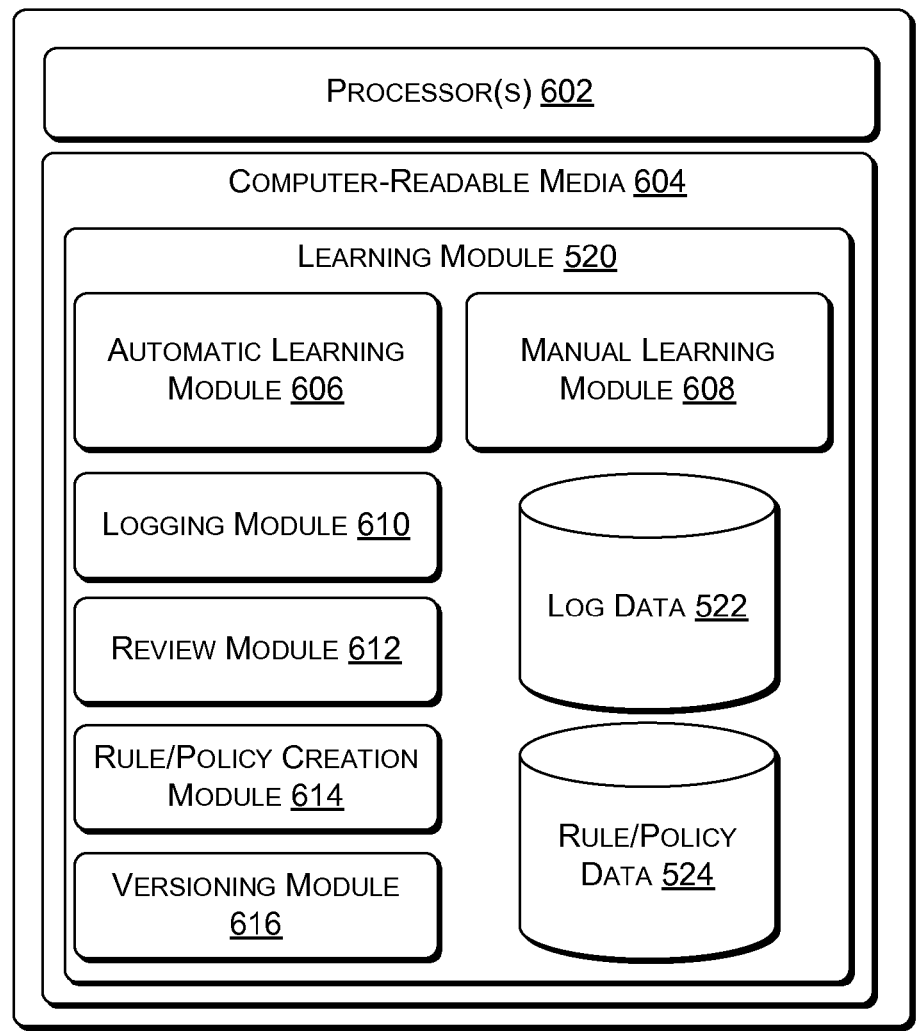
FIG. 6 is a block diagram of an illustrative computing architecture of an transmission manager that is part of the computing service shown in FIG. 1.
Figure 6:
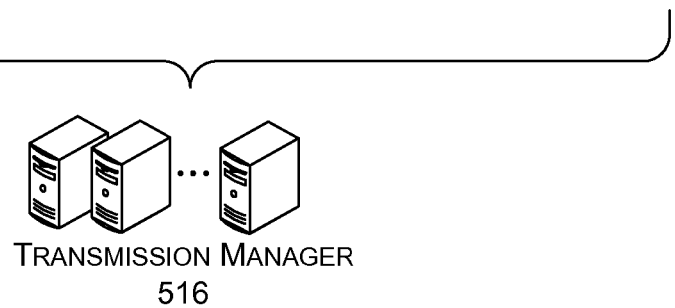

FIG. 6 illustrates further details of the TM 518. As illustrated, the TM 518 comprises one or more processors 602 and computer-readable memory 604. The one or more processors 602 and/or the computer-readable memory 604 may be implemented in a distributed or non-distributed architecture. As shown in FIG. 1, the environment may include many instances of the TM 518 at various points within a data structure. Thus, the TM 518 may represent one or more of the TMs shown in FIG. 1, for example. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download or upload.

The computer-readable memory 604 stores or otherwise has access to the learning module 520. The learning module 520 may include additional components, modules, and/or programs, including an automatic learning module 606, a manual learning module 608, a logging module 610, a review module 612, and/or a policy/rule creation module 614, and a versioning module 616, each described in turn. The computer-readable memory 604 may also store or otherwise access the log data 522 and the rules/policy data 524. Some of the aforementioned modules may be run on a different set of systems, and thus distributed, as discussed above. For example, the logging module 610 may be separate from the automatic learning module 606 and/or the manual learning module 608 in some embodiments.

The automatic learning module 606 may cause the computing service to operate in an automatic learning mode. The automatic learning module 606 may cause partial or complete removal or disablement, at least temporarily, of the rule sets that block network access to some or all resources available in the computing service 504. For example, the automatic learning module 606 may cause the TM 518 to change enforcement policies regarding established rule sets. The rule sets may include firewall rules and/or other security rules that prevent unauthorized network access to a virtual machine running the software 508. The automatic learning module 606 may allow software, such as the software 508, to run in the computing service 504 during the automatic learning mode even when the software would otherwise be restricted from performing some operations in accordance with the rule sets. While the software is running in the automatic learning mode, the logging module 610 may record events, activities, and/or other information, as discussed below.

After a certain amount of time, the automatic learning module 606 may terminate the automatic learning mode to restore the rule sets, possibly with at least some new rules, that protect some or all resources available in the computing service. In some embodiments, the automatic learning module 606 may terminate the automatic learning mode to restore the rule sets, including any new rules, in response to observed behavior of the software 508 that runs in the computing service during the automatic learning mode. The new rules may be subject to approval before implementation, as discussed below. For example, the automatic learning module 606 may analyze the log data 522 to identify when new and unique events/operations are no longer logged or have not been logged for a threshold amount of time. This information may be used to determine that the software 508 has obtained and/or explored most or all rule sets, and thus may trigger termination of the automatic learning mode. However, other events, analysis, or information, possibly including received user input (e.g., a threshold amount of time, etc.), may cause the automatic learning module 606 to terminate the automatic learning mode.

The manual learning module 608 may cause the computing service to operate in a manual learning mode. The manual learning module 608 may continue to cause the TM 518 to use and enforce the rules sets that protect some or all resources available in the computing service 504. However, the manual learning module 608 may allow software, such as the software 508, to run in the computing service 504 during use of the manual learning mode. While the software is running in the manual learning mode, the manual learning mode may enable a user to create rules to allow certain kinds of network access. The user may enable creation of new rules by responding to a message or prompt (e.g., an email, a console prompt, a text, etc.). For example, when access to or from the software is blocked by a rule set, a user may be given an opportunity to create a rule and/or update a policy to allow the operation (e.g., cause the TM 518 to allow the operation in light of the rule sets, etc.). The logging module 610 may record these events, activities, and/or other information, as discussed below. In some instances, at least part of the software may be rerun to allow the network access that was previously blocked. The software may then continue to run until the next operation is blocked, and so forth. Thus, the TM 518 may use the manual learning mode to allow a user to step through operations of the software, and create rule/policy updates in response to blocked events.

After a certain amount of time, the manual learning module 608 may terminate the manual learning mode, such as in response to a triggering event. In some embodiments, the manual learning module 608 may terminate the manual learning in response to user request, such as when the user is satisfied that the policies have been adequately updated to allow the software to run in the computing service 504 without being blocked by the TM 518 from accessing computing resources protected by rule sets.

In some embodiments, the automatic learning module 606 may create and/or operate in a shadow computing service which may be disconnected or independent from a live version of the computing service. For example, the TM 518 may send simulated network traffic to the software using a shadow service rather than allowing the software 508 to modify data in a live version of the computing service while the software 508 is running in a learning mode.

In various embodiments, a versioning module 616 may create revision information to enable restoration of a previous version of the rule sets. The revision information may allow the TM 518 to undo changes and/or revert back to the rule sets that existed prior to addition of new rules created during or after use the learning mode. For example, revision information may be recorded in intervals, before allowing network access to rule sets by the software 508, and so forth.

The logging module 610 may log the interactions caused by the software while running in the computing service 504, such as the interactions between the software and the computing resources 514 and/or rule sets. For instance, the logging module 610 may record the interactions in the log data 522. The recorded interactions may include a network connection and a port accessed for individual interactions.

The review module 612 may enable a user to modify log data 522, approve logged events in the logged data 522, and/or otherwise verify or validate information generated by the logging module 610 and stored in the log data 522. By using the review module 612, network access permissions may be custom crafted to prevent undesirable network access by the software to particular resources, via the rule sets, and/or explicitly allow network access to other resources, via the rule sets. For example, if the log data 522 shows that the software accessed an incorrect resource, the review module 612 may update the information to allow creation of a correct permission or rule for the rule set. The review module 612 may also allow oversight of creation of rules to ensure that newly created rules are created to be restrictive as possible to allow a requested operation by the software. Thus, the review module 612 may prevent creation of rules that are overly broad and allow undesirable access.

The policy/rule creation module 614 may create and/or update rules and/or policy based in part on the log data 522 and/or modifications to the log via the review module 612. The rules and/or policy may enable the software to run in the computing service 504 without being blocked from accessing computing resources protected by rule sets.

In some embodiments, the learning module 520 may store templates that provide rules for use for some specific types of software, such as off the shelf software. The rules may be default rules that may be added to a rule set. The rules may create an initial access policy for use with a computing node operating the software 508. The learning module 520 may then cause operation in the manual learning mode or the automatic learning mode to modify the rules to enable the computing node to obtain the network access while operating the software. Thus, the templates may provide a starting block for the access policy and may prevent or reduce some vulnerability of the computing node while operation in a learning mode.

In some embodiments, the learning module 520 may associate metadata for software to a rule set generated in the manual or automatic modes. For example, the learning module 520 may include executable code that associates a software program's name, version number, or other identification information for the program with a rule set. The association could be stored in the rule set or in a database. Over time the learning module 520 can build a repository of rule sets for a given program and use the rule sets to generate a template of default rules. For example, the learning module 520 can include executable code for analyzing the rule sets to identify the most common rules that customers apply to a program.

In various embodiments, a customer of the service provider can specify metadata for software in a request. For example, a customer can submit a request that specifies a compute node; an action to run in a learning mode; and specify metadata about the software that is running or will run in the compute node. In response, the learning module 520 can parse the metadata and search the database or a data store to identify whether a template for the software has been stored. The learning module 520 can cause the rule set in the template to be applied to the traffic to or from the compute node. In some embodiments, any new rules the learning module 520 creates during a learning mode can be provided to the user for approval. For example, a web console or the like can include a graphical user interface that can receive a list of the new rules. The graphical user interface can be configured to receive input from the customer to approve or reject the new rules. Any accepted new rules can be stored for the customer. The new rules can also be processed to determine whether to update the template for the software.

Example Processes

Figure 7:
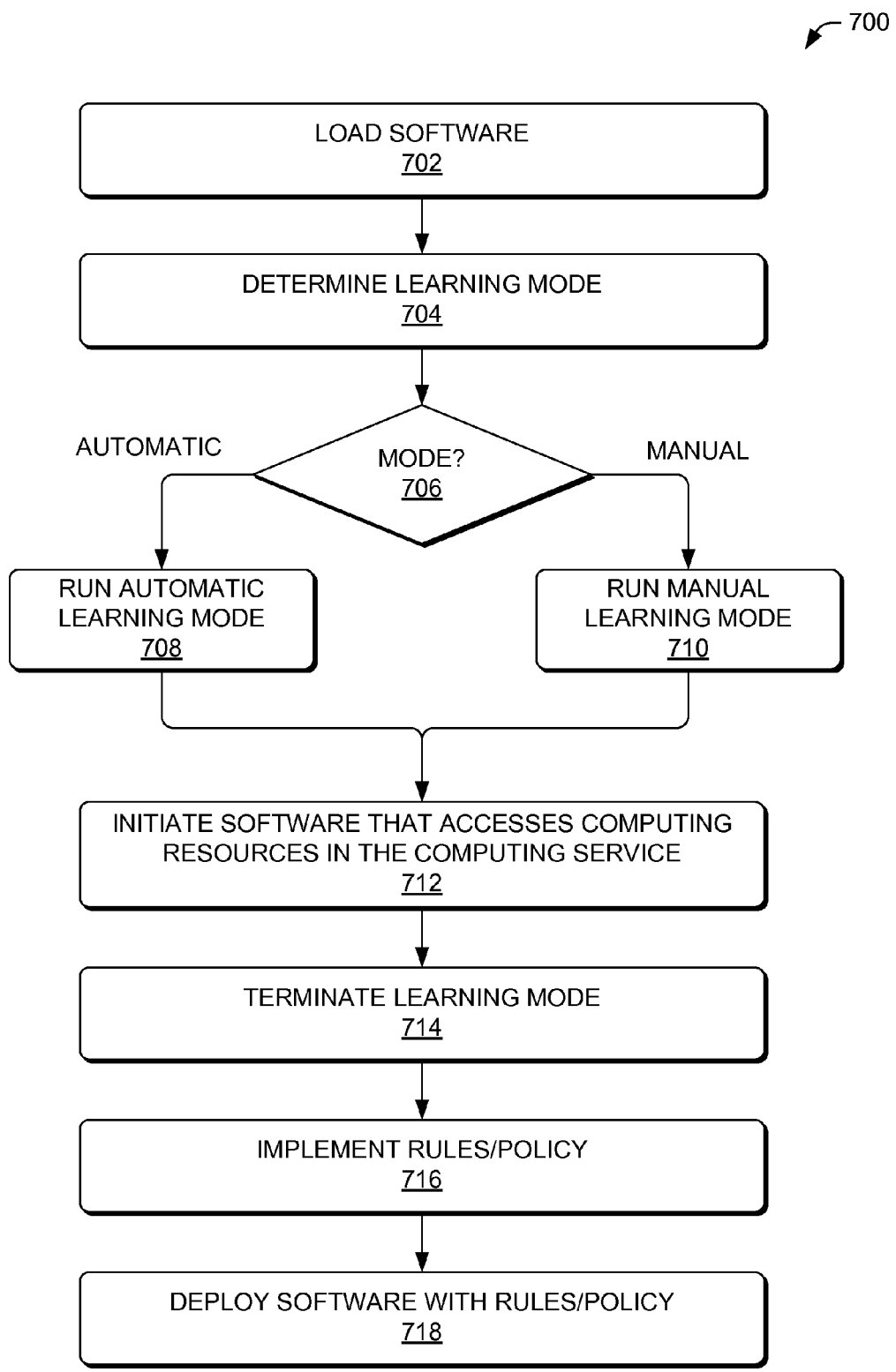
FIG. 7 is a flow diagram of an illustrative process of initiating a learning mode that may implement a manual learning mode and/or an automatic learning mode used to configure and/or create access rights associated with the software.
Figure 8:
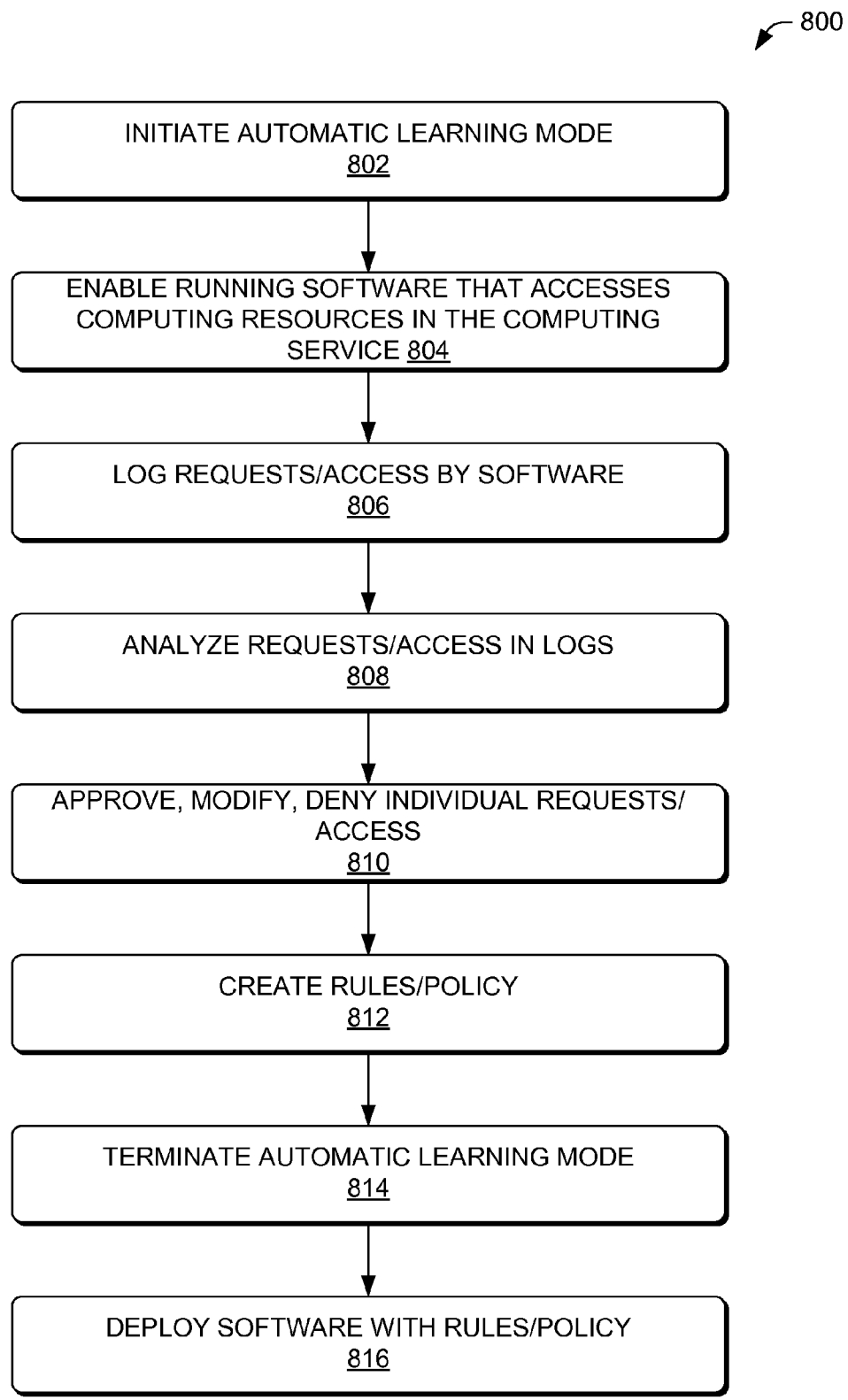
FIG. 8 is a flow diagram of an illustrative process of implementing an automatic learning mode that logs activity while software runs in the computing service, and uses the logs to create rules and/or a policy that provides access rights for the software to enable running of the software after termination of the automatic learning mode when the computing service is operating in a normal mode.
Figure 9:
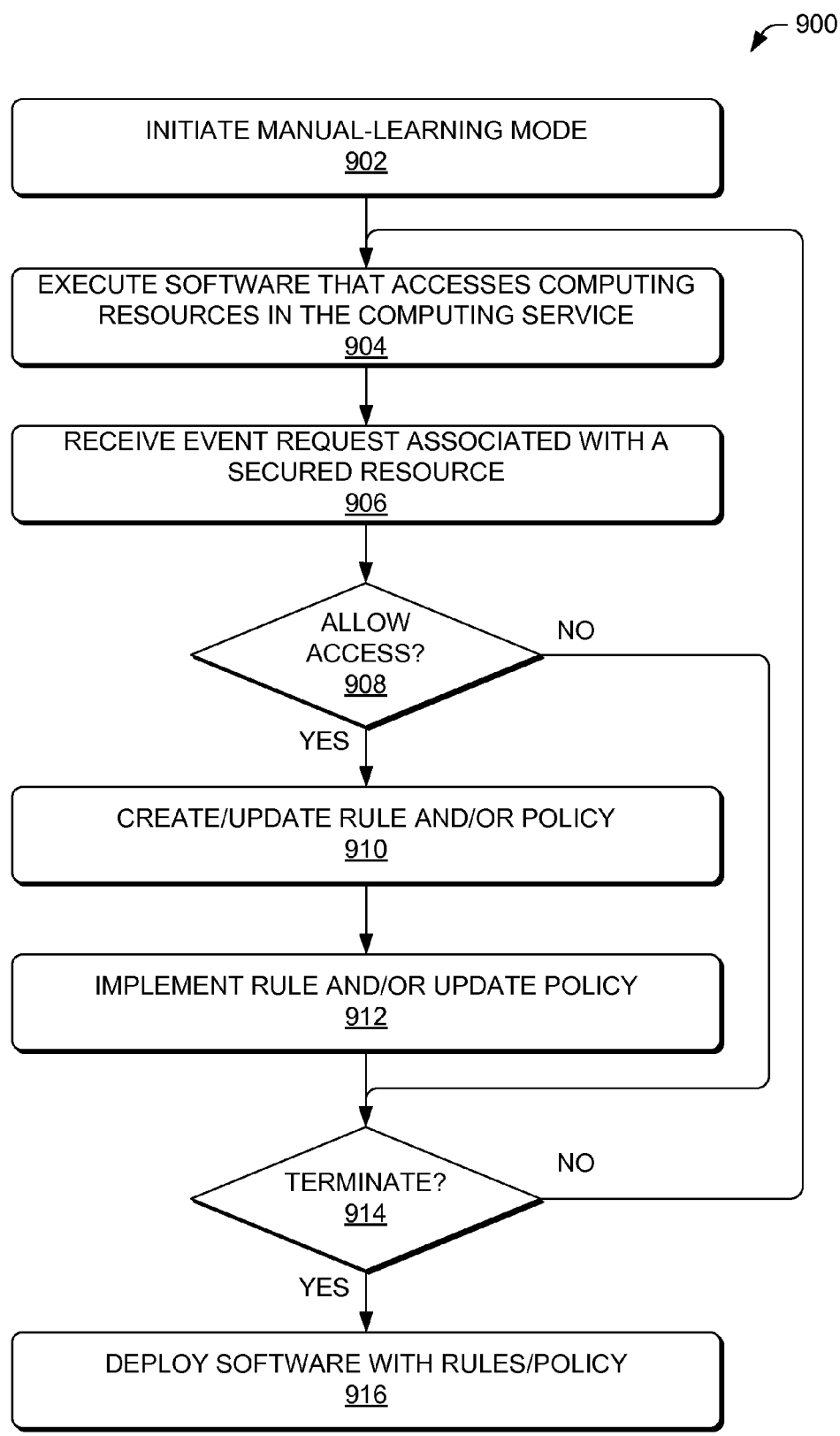
FIG. 9 is a flow diagram of an illustrative process of implementing a manual learning mode to create rules, which may then be used to create a policy that provides access rights for the software.

FIGS. 7-9 are flow diagrams of illustrative processes to create rules/policies to allow software to run in a computing service. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes are described with reference to the environment 500 and the TM 518 described with reference to FIG. 2. Of course, the processes may be performed in other similar and/or different environments.

FIG. 7 shows an illustrative process 700 of initiating a learning mode that may implement a manual learning mode and/or an automatic learning mode used to configure and/or create network access rights associated with the software.

At 702, the computing service 504 may load software to be run in the computing service 504. In some embodiments, the user 502 may initially select an operating system, launch a virtual machine that includes the operating system, and then install the software. The software may be loaded by accessing, importing and/or uploading source code, modules, a software package, and/or other software components to be executed in part by resources of the computing service 504. The software 508 may be off the shelf software that may or may not be preconfigured for operation in the computer service. The software 508 may be custom software developed for use by a service such as the computing service 504. The software 508 may not include or be associated with permissions of rule sets in the computing service 504 until the permissions are updated using rules and/or a policy.

At 704, the learning module 520 may determine a learning mode to execute while running the software in the computing service 504. In some embodiments, the learning module 520 may prompt the user 502, the administrator 512, and/or another person to select a learning mode from the automatic learning mode, the manual learning mode, or possibly from a hybrid learning mode, which may include elements of the automatic learning mode and the manual learning mode. However, in some instances, only a single learning mode may be available for use. As an example, the user 502 may access a console, select a virtual machine, and then select a control that activates a learning mode for setting and enforcing rule sets.

At 706, the learning module 520 may initiate use of the mode determined at the operation 704. When the learning module 520 determines to initiate use of the automatic learning module 606 to run the automatic learning mode, the process 700 may advance to an operation 708 via the "automatic" route. At 708, the automatic learning module 606 may run the automatic learning mode as the learning mode. Further details of the operation of the automatic learning mode are discussed with reference to FIG. 8.

When the learning module 520 determines to initiate use of the manual learning module 608 to run the manual learning mode, the process 700 may advance to an operation 710 via the "manual" route. At 710, the manual learning module 608 may run the manual learning mode as the learning mode. Further details of the operation of the manual learning mode are discussed with reference to FIG. 9. In some embodiments, a hybrid mode may be run that combines elements of the automatic learning mode and the manual learning mode in series, in parallel, and/or in a piecemeal fashion.

At 712, following the operation 708 and/or the operation 710, the software 508 may be initiated and run in the respective learning mode. As discussed above, various logging events, log reviews, rule creation and/or other tasks may occur during the running of the software. These events are described in further detail below with reference to FIGS. 8 and 9.

At 714, versioning may be performed to record or otherwise track the rule sets to capture revision information to enable restoration of a previous version of the rule sets. The revision information may allow the TM 518 to undo changes and/or revert the rule sets to a prior version that existed before a change caused by the software 508. For example, revision information may be recorded in intervals, before allowing network access to privileged information protected by the rules sets by the software 508, and so forth.

At 716, the learning module 520 may terminate the learning mode. After the termination, the computing service 504 may resume operation in a normal operating mode. In some embodiments, the learning mode may be terminated in response to a user action. However, the learning mode may be terminated in response to events, lack of events, and/or other system-based triggers. For example, the terminating may occur after a predetermined amount to time or other system-based triggering event.

At 718, the rule/policy creation module 614 may create and/or implement rules and or policies, which may be created during the operation of the computing service 504 in the learning mode or after the learning mode is terminated at the operation 716. In some embodiments, the rules may be reviewed prior to the implementation of the rules. For example, the review module 612 may allow the user 502 to view newly created rules and approve the rules prior to implementation of the rules. The rules/policy may be stored in the rule/policy data 524. Further details about creation and implementation of the rules/policy are described in further detail below with reference to FIGS. 8 and 9.

At 720, the software may be run in the computing service 504 operating in the normal operating mode. The computing service 504 may use the rules/policy, enforced by the TM 518, to allow network access, by the software 508, to resources via the rule sets, which would otherwise not be available without the performance of the process 700.

FIG. 8 shows an illustrative process 800 of implementing an automatic learning mode.

At 802, the automatic learning module 606 may initiate the automatic learning mode, thereby causing the computing service 504 (via the TM 518) to at least temporarily partially or completely disable or relax rules sets associated for one or more computing resources in the computing service 504. In some embodiments, the automatic learning mode, when implemented, may cause the computing service 504 to allow some software to run without regard to a particular network access policy. A particular software application may be identified or otherwise made exempt from such network access policies and/or the network access polices may be applied to other software run in the computing service. To identify the software, the automatic learning module 606 may track a unique identifier used to identify the particular software to allow tracking and network access privileges.

At 804, the automatic learning module 606 may enable running of the software, such as the software 508, in the computing service 504. The software may attempt to access computing resources (e.g., virtual machines, etc.), such as resources protected by the rule sets However, the software may initially lack permissions to access the computing resources based on current ones of the rule sets when the software 508 is run in a normal operating mode (e.g., after termination of the automatic learning mode, etc.) without modification to the rules sets via updates and/or creation of rules. The software 508 may be granted access to the computing resources 514 by creation of a new rule when an existing rule does not permit access. In some embodiments, network communication protocols and ports may be opened during the automatic learning mode, as least for access by the particular software initiated at the operation 804.

At 806, the logging module 610 may log requests/access by the software 508 to computing resources, such as resources in the computing resources 514. The logging module 610 may log the interactions caused by the software 508 running in the computing service 504. In various embodiments, the logging module 610 may record the interactions in the log data 522. The recorded interactions may include a network communication protocols and/or ports used. For example, a recorded interaction may indicate that a source "B" accessed a destination "D" via HTTP.

At 808, the review module 612 may allow a user to analyze the requests and/or access caused by the software 508 as recorded or otherwise captured by the logging module 610 via the operation 806. For example, the review module 612 may determine an extent of a network connection access (e.g., which resources, how often, etc.), a time since a last new resource was accessed, aggregate information accessed, and so forth. This information may be reported to a user, such as the user 502 and/or the administrator 512 and/or otherwise used to create or review rules and/or policies, that if implemented, enable the software 508 to access the resources, via the rule sets, when the computing service 504 is running in a normal operating mode.

At 810, the review module 612 may allow the user to approve, modify, and/or deny individual requests and/or access to resources via the rule sets. In some embodiments, the review module 612 may receive user input during the analysis or implementation. For example, the review module 612 may enable a user to modify log data 522, approve logged events in the logged data 522, craft a specific rule, and/or otherwise verify or validate information generated by the logging module 610 and stored in the log data 522. By using the review module 612, network access permissions may be custom crafted to prevent undesirable network access by the software to particular resources and/or explicitly allow network access to other resources. For example, if the log data 522 shows that the software accessed an incorrect resource via a port, the review module 612 may allow a user to update the information to allow creation of a correct permission or rule to access the correct resource via a correct port. As another example, the review module 612 may allow a user to modify, add, or remove network communication protocols and or ports to allow or prevent network access by the software 508 to such protocols and/or ports. As a further example, the review module 612 may allow a user narrow or broaden a rule to make the rule more or less restrictive.

At 812, the rule/policy creation module 614 may create and/or update rules/policy based in part on the logged data from the operation 806, the analysis from the operation 808, the information from the operation 810, and/or received user input. In some embodiments, the rule/policy creation module 614 may create a restrictive rule or otherwise narrow rule that is specifically tailored to allow network access caused by the software without permitting other types of network access different than the type of network access by caused by the software. The network access may be narrowed by a protocol, destination IP address, source IP address, port number, transport layer type, internet control message protocol (ICMP) type and code and one or more rules to apply to the traffic (e.g., allow, deny, etc.), and so forth. In some embodiments, the rule sets may be revised as more traffic is observed. For example, some rules may be compressed (e.g., from one IP address to a classless inter-domain routing (CIDR) block, or allow traffic "to" or "from" a virtual machine, etc.). The rules and/or policy may enable the software 508 to run in the computing service 504 running in the normal operation mode without being blocked from accessing resources protected by rule sets used by the software 508.

At 814, the automatic learning module 606 may terminate the automatic learning mode to cause the computing service 504 to resume operation in the normal operating mode.

At 816, the software 508 may be deployed with the TM 518 using the rules/policies created and/or updated at the operation 812. The software 508 may be run in the computing service 504 operating in the normal operation mode.

FIG. 9 shows an illustrative process 900 of implementing a manual learning mode to allow creation of rules, which may then be used to create a policy that provides network access rights to allow the software 508 to gain specific network access.

At 902, the manual learning module 608 may initiate the manual learning mode. When the software causes an operation that requires network access to a computing resource via a rule set, the computing service, while operating in the manual learning mode, may block the access and may log the event and/or notify a user to address the event. For example, the user may be notified by a message via an email, a text, a console prompt, etc.

At 904, the manual learning module 608 may enable running of the software, such as the software 508, in the computing service 504. The software 508 may attempt to access computing resources (e.g., virtual machines, etc.), such as resources in the various computing resources 514 protected by the rule sets. However, the software 508 may initially be denied access by the rule sets to resources when the software is run in the computing service 504 operating in a normal operating mode (e.g., after termination of the manual learning mode, etc.) without modification to the rule sets. The software 508 may attempt to access the computing resources 514 using network communication protocols and port addresses.

At 906, the manual learning module 608 may receive an event or operation request associated with a secured resource, such a virtual machine protected by the rule sets. For example, the manual learning module 608 may receive the event in response to an action caused by the software. For example, a network access request caused by the software may be denied by the TM 518 based on the rule set. The manual learning module 608 and/or the logging module 610 may capture or otherwise receive information pertaining to the event, such as a network connection and port to be accessed, etc. The manual learning module 608 and/or the logging module 610 may capture or otherwise receive other information such as an identity of the source, destination, protocol, etc., and/or other relevant information that may allow a user, the administrator 512, and/or another person to decide whether or not to allow the requested network access.

At 908, the TM 518, in conjunction with the manual learning module 608, may determine whether to allow network access to the resource, via the rules set in response to at least the event received at the operation 906. For example, the manual learning module 608 may receive an input, possibly by a user and/or the administrator 512, which may indicate a desire to allow access or deny access. When the access is determined to be allow (following a "yes" route from the decision operation 908), the process 900 may proceed to an operation 910.

At 910, the rule/policy creation module 614 may create and/or update rules/policy based in part on the allowed access determined at the decision operation 908. A new rule may be created manually by the user and/or created by rule/policy creation module 614 and possibly subject to review/approval by the user. In some embodiments, the rule/policy creation module 614 may create a restrictive rule or otherwise narrow rule that is specifically tailored to allow network access caused by the software without permitting other types of network access different than the type of network access by caused by the software. The network access may be narrowed by a protocol, destination IP address, source IP address, port number, transport layer type, internet control message protocol (ICMP) type and code and one or more rules to apply to the traffic (e.g., allow, deny, etc.), and so forth. In some embodiments, the rule sets may be revised as more traffic is observed. For example, some rules may be compressed (e.g., from one IP address to a classless inter-domain routing (CIDR) block, or allow traffic "to" or "from" a virtual machine, etc.).

At 912, the TM 518 may implement a rule and/or a policy that is created or updated at the operation 910 to allow the software to perform the action received at the operation 906. Thus, the manual learning module 608 may cause the TM 518 to allow the software access a resource in response to the creation or update of the rule/policy from the operation 910. In some embodiments, the manual learning module 608 may cause the software to re-execute the request, and thus gain the access via the new rule(s) included in a revised rule set.

When the access is not allowed (following a "no" route from the decision operation 908) or following the operation 912, the process 900 may proceed to a decision operation 914. At 914, the manual learning module 608 may determine whether to terminate the manual learning mode and cause the computing service 504 to resume operation in a normal operating mode. When the manual learning module 608 does not terminate the manual learning mode (following a "no" route from the decision operation 914), then the process 900 may continue at the operation 904. When the manual learning module 608 does terminate the manual learning mode (following a "yes" route from the decision operation 914), then the process 900 may continue at an operation 916.

At 916, the software 508 may be deployed with the TM 518 using the rules/policies created and/or updated via occurrences at the operation 910, which may have occurred one or more times as the software 508 was run in the manual learning mode. The software 508 may be run in the computing service 504 operating in the normal operation mode.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. One or more non-transitory computer-readable media storing computer-executable instructions that, when executed, cause one or more processors to perform acts comprising:
   causing a computing service to operate in a normal operation mode that implements rule sets that prevent unauthorized network access to one or more customer virtual machines operated by the computing service;
   causing the computing service to transition operation from the normal operation mode to a learning mode that at least temporarily disables at least some of the rule sets for a virtual machine and allows software, without previous configuration, to cause the virtual machine to obtain network access;
   recording, in a data log, information about traffic sent to or from the virtual machine in response to operations caused by the software;
   creating rules, based at least in part on the information about the traffic sent to or from the virtual machine in the data log, to include in the rule sets, the created rules to allow subsequent traffic to or from the virtual machine that is similar in at least one respect to the recorded information about the traffic;
   causing the computing service to terminate the learning mode and resume operation in the normal operation mode; and
   enforcing the rule sets that include the created rules.

2. The one or more non-transitory computer readable media as recited in claim 1, wherein the rules sets include at least one of a source Internet Protocol (IP) address, a destination IP address, and a permission.

3. The one or more non-transitory computer readable media as recited in claim 1, wherein the creating the rules includes creating restrictive rules that are narrowly tailored to only allow the subsequent traffic to or from IP addresses recorded in the data log.

4. The one or more non-transitory computer readable media recited in claim 1, wherein the acts further comprise identifying a triggering event that initiates termination of the learning mode, and wherein the causing the computing service to terminate the learning mode is performed in response to the identifying the triggering event.

5. The one or more non-transitory computer readable media as recited in claim 4, wherein the acts further comprise at least one of:
   analyzing the data log to determine an amount of time since a last new rule was created, and wherein the identifying the triggering event occurs in response to the amount of time reaching or exceeding a threshold amount of time, or
   receiving a user input to terminate the learning mode, and wherein the identifying the triggering event occurs in response to receiving the user input.

6. The one or more non-transitory computer readable media as recited in claim 1, wherein the acts further comprise receiving user input to modify or remove at least one of the created rules.

7. A method comprising:
   executing software to run in a computing node;

monitoring, by a transmission manager operating a learning module in a learning mode, network traffic of the computing node, the network traffic caused at least in part by the executing of the software;

determining, via the learning module executed by a processor, an access policy for the computing node based at least in part on the monitored network traffic during the learning mode; and terminating the learning mode prior to or in response to completion of determining the access policy.

8. The method as recited in claim 7, wherein the access policy includes rule sets that permit or deny access to or from the computing node.

9. The method as recited in claim 7, wherein the computing node includes a virtual machine protected by one or more virtual firewalls.

10. The method as recited in claim 7, wherein the determining the access policy creates a second version of the access policy, and further comprising:

storing a first version of the access policy prior to the executing of the software; and reverting to the first version of the access policy in response to at least a rejection of the second version of the access policy.

11. The method as recited in claim 7, wherein the learning mode is an automatic learning mode that causes the transmission manager to at least temporarily disable at least some rule sets of an existing access policy for the computing node and allows the software, without previous configuration, to cause the computing node to obtain network access.

12. The method as recited in claim 11, wherein the monitoring the network traffic occurs while the software runs in the automatic learning mode.

13. The method as recited in claim 11, further comprising detecting a triggering event, the triggering event being at least one of a received user input to terminate the automatic learning mode, an expiration of time, or a system-based trigger associated with the network traffic caused by operation of the software; and wherein the terminating the automatic learning mode occurs in response to the detecting the triggering event.

14. The method as recited in claim 7, wherein the learning mode is a manual learning mode that causes the transmission manager to enforce an existing access policy that implements rule sets that prevent unauthorized network access to or from the computing node in response to operation of the software, and further comprising:

transmitting a request to modify the existing access policy that prevents the software from accessing one of the computing resources; and receiving, in response to the request, an authorization to modify the existing access policy to allow the computing node to obtain network access.

15. The method as recited in claim 14, wherein the determining the access policy is further based at least in part on the authorization to modify the existing access policy to allow the computing node to obtain network access.

16. A system comprising:

one or more processors;

memory;

a virtual machine implemented in the memory that acts as an independent computing node and executes at least one application program in a portion of the memory allocated to the virtual machine; and a transmission manager implemented in the memory and associated with the independent computing node, the transmission manager including:

a learning module to initiate a learning mode to permit the independent computing node, to obtain network access in response to operations caused by software during a configuration of the software;

a logging module to log the network access while the independent computing node operates in the learning mode; and a policy creation module, stored in the memory and executable on the one or more processors, to craft an access policy based at least in part on the logged network access, the access policy to allow the independent computing node to obtain the network access in response to operations caused by the software after termination of the learning mode.

17. The system as recited in claim 16, wherein the learning mode is an automatic learning mode that at least temporarily disables at least some rule sets of an existing access policy while allowing the software, without previous configuration, to cause the independent computing node to obtain the network access.

18. The system as recited in claim 17, wherein the automatic learning module further tracks an identifier of the software, and wherein the automatic learning mode enforces the existing access policy for operations of the independent computing node caused by other software that does not include the identifier of the software.

19. The system as recited in claim 16, wherein the learning mode is a manual learning mode that causes the transmission manager to enforce an existing access policy that implements rule sets that prevent unauthorized network access to or from the independent computing node in response to operation of the software, and to request authorization, via received user input, to grant access to allow subsequent and similar network access to or from the independent computing node in response to operation of the software.

* * * * *